United States Patent
Chan et al.

(10) Patent No.: US 7,877,226 B2
(45) Date of Patent: Jan. 25, 2011

(54) APPARATUS AND METHOD FOR COUNTING EXERCISE REPETITIONS

(75) Inventors: Raymond Chan, Hong Kong (CN); Mun Hoong Leong, Hong Kong (CN); Li Li, Hong Kong (CN)

(73) Assignee: IDT Technology Limited, Hong Kong SAR (CN)

( * ) Notice: Subject to any disclaimer, the term of this patent is extended or adjusted under 35 U.S.C. 154(b) by 347 days.

(21) Appl. No.: 12/041,645

(22) Filed: Mar. 3, 2008

(65) Prior Publication Data

US 2009/0221403 A1    Sep. 3, 2009

(51) Int. Cl.
*G06F 17/40* (2006.01)
*G06F 17/00* (2006.01)

(52) U.S. Cl. .......... 702/160; 702/66; 702/141; 702/187; 377/24.2; 482/8; 482/74; 73/379.01; 73/488; 73/491

(58) Field of Classification Search .......... 702/66, 702/141, 160, 187
See application file for complete search history.

(56) References Cited

U.S. PATENT DOCUMENTS

| | | | | |
|---|---|---|---|---|
| 5,724,265 A | * | 3/1998 | Hutchings | 702/141 |
| 6,700,499 B2 | * | 3/2004 | Kubo et al. | 340/686.1 |
| 7,305,323 B2 | * | 12/2007 | Skvortsov et al. | 702/160 |
| 2007/0073514 A1 | * | 3/2007 | Nogimori et al. | 702/160 |
| 2007/0143068 A1 | * | 6/2007 | Pasolini et al. | 702/160 |
| 2009/0076765 A1 | * | 3/2009 | Kulach et al. | 702/141 |
| 2009/0132197 A1 | * | 5/2009 | Rubin et al. | 702/141 |
| 2009/0240461 A1 | * | 9/2009 | Makino et al. | 702/141 |

FOREIGN PATENT DOCUMENTS

EP    1813916 A1    1/2007

\* cited by examiner

*Primary Examiner*—Hal D Wachsman
(74) *Attorney, Agent, or Firm*—Eagle IP Limited; Jacqueline C. Lui (57) ABSTRACT

An apparatus and method for counting exercise repetitions are provided for counting exercise repetition even when an exerciser attaches the apparatus in different places and along different orientations of his or her body. The apparatus and method utilizes acceleration data along at least three axes and determines that a valid step is taken by the exerciser if at least one of acceleration profiles falls within at least one of pre-defined thresholds. Moreover, a method of identifying an optimal axis for exercise repetition measurement is disclosed by comparing the acceleration profiles of previous steps with amplitude, cycle and rhythm thresholds.

17 Claims, 10 Drawing Sheets

APPARATUS AND METHOD FOR COUNTING EXERCISE REPETITIONS

FIELD OF INVENTION

This invention relates to an exercise repetition counter and in particular an exercise repetition counter that count the correct number of repetitions irrespective of how the counter is oriented.

BACKGROUND OF INVENTION

Exercises repetition counters have been frequently used by professional athletes as well as amateurs in sport activities to provide accurate and reliable counting of repetitive actions. Such repetitions counters include pedometers, swim lap counters, weight lifting counters, etc. Traditional pedometers usually utilize a one-dimensional pendulum sensor which requires the user to mount the pedometer on the waist. When the user takes one step, the pendulum sensor increments the step count. However, this kind of pedometer has strict requirement on how it is worn (especially the orientation) on the user and the accuracy is quite limited because the orientation of the pedometer must be strictly kept.

In order to achieve more accurate counting function and less wearing restrictions, exercise repetition counters with more than one sensor have been developed. Examples of such exercise repetition counters are disclosed in U.S. Pat. No. 6,700,499, where a pedometer count the step number in a specified direction selectively from a plurality of sensors. Such specified direction is determined by selecting a reference axis and then the counting is based on the selected reference axis. This type of configuration, however, is not adaptable enough as there are delays in changing to a new reference axis when the orientation of the pedometer is frequently changed in a short period.

Another publication EP 1,813,916 discloses a pedometer containing a three dimensional (3D) accelerometer. The pedometer detects and updates step counts based on an available acceleration signal that is extracted from raw acceleration data with a threshold value. Moreover, the thresholds are updated only based on the amplitude of the waveform as measured by the accelerometer.

SUMMARY OF INVENTION

In the light of the foregoing background, one embodiment of the present invention provides an accurate apparatus and method for counting exercise repetitions even when the user attaches the apparatus in different places and along different orientations on his or her body.

Accordingly, the present invention, in one aspect, is an apparatus for counting exercise repetitions including:
1) At least three accelerometers which measures the acceleration profiles of an exerciser simultaneously along at least three directions;
2) a data processing unit which executes an algorithm to add to a repetition count if at least one of the acceleration profiles falls within thresholds;
3) a display means which is connected to the data processing unit; and
4) a memory means which is connected to the data processing unit; whereby the apparatus is capable of counting the exercise repetitions of the exerciser irrespective of the orientation of the apparatus.

In another aspect of the present invention, a method of counting exercise repetitions includes the steps of 1) measuring the acceleration of an exerciser along at least three axes simultaneously;
2) comparing the acceleration profile on each axis with thresholds; and
3) adding to a repetition count if at least one of the acceleration profiles falls within at least one of the thresholds.

In a further aspect of the present invention, a method of identifying optimal axis for counting exercise repetitions includes:
1) simultaneously measuring the acceleration of an exerciser along at least three axes;
2) detecting a first valid repetition along a first axis when an acceleration profile on the first axis satisfies a first amplitude threshold range and a cycle threshold range first before other two axes. This axis is referred as the first axis;
3) determining a previous optimal axis that is different from the first axis as a second axis;
4) computing a first amplitude indicator, a first cycle indicator and a first rhythm indicator from the first axis, and a second amplitude threshold, a second cycle threshold range and a rhythm threshold range from the second axis;
5) identifying the first axis as the optimal axis when the first amplitude indicator satisfy the second amplitude threshold; the first cycle indicator is within the second cycle threshold range and the first rhythm indicator is within the rhythm threshold range.

In one embodiment the exercise repetition counter in the present invention is able to detecting the movement along the three axes in the 3D space simultaneously by utilizing three accelerometers. As such no matter how the pedometer is placed, it still can count steps in an accurate and reliable way.

Exemplary embodiment also utilize a counting algorithm that examines a plurality of consecutive steps before deciding whether the orientation of the apparatus has changed, and if a chance is detected, the algorithm will select a different axis. Measuring a plurality of steps for valid step count ensures that the user's irregular movement of the user will not interfere with the counting of the repetition counter.

DETAILED DESCRIPTION OF PREFERRED EMBODIMENT

As used herein and in the claims, "comprising" means including the following elements but not excluding others.

Figure 1:
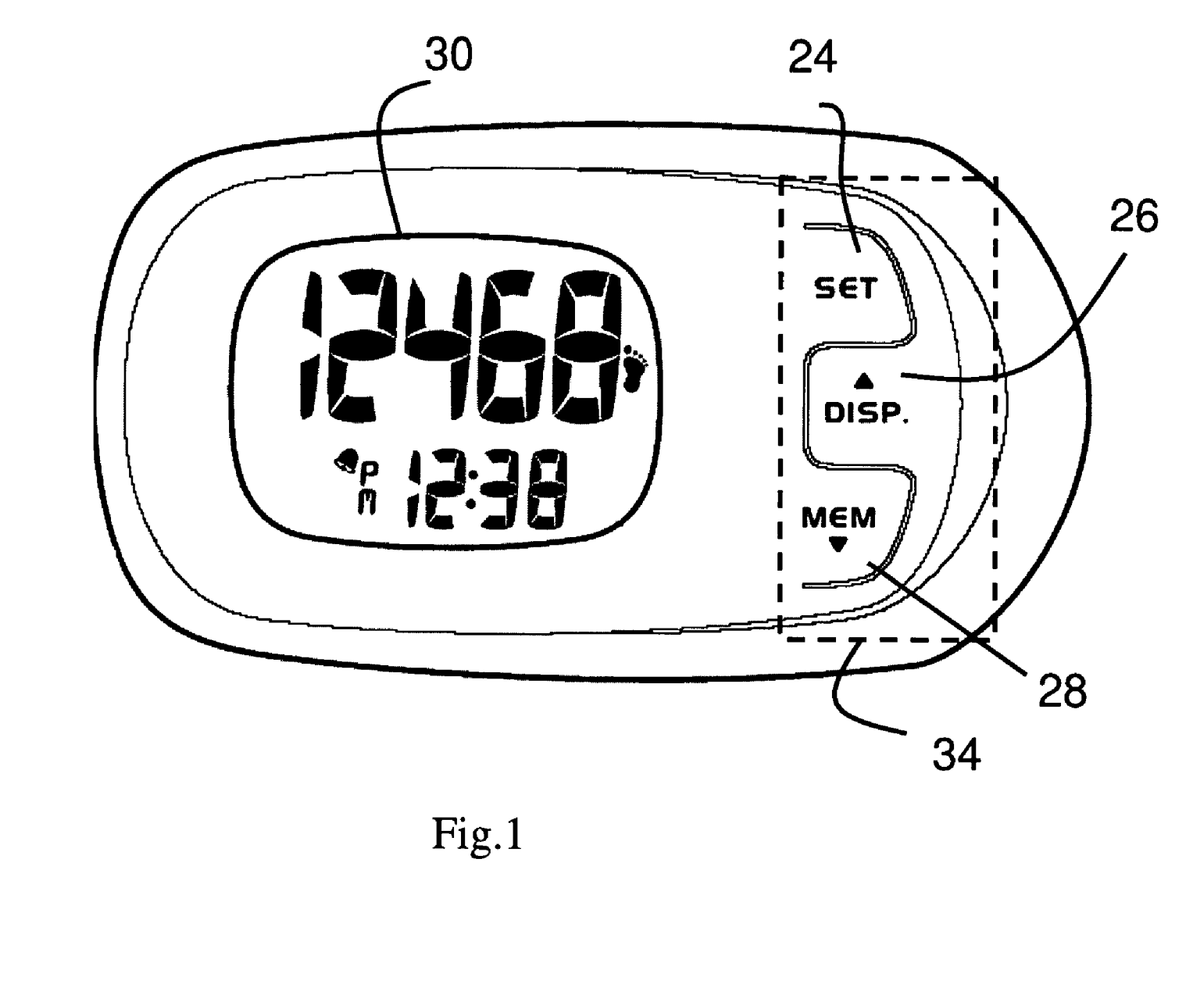
FIG. 1 is a front view of an exercise repetition counter according to one embodiment of present invention.

Referring now to FIG. 1, the first embodiment of the present invention is a portable exercise repetition counter that includes a display unit 30 and a setting unit 34. The setting unit 34 further comprises three buttons as the 'set' button 24, 'display' button 26 and the 'mem' button 28. The buttons 24, 26 and 28 enable the user to select appropriate functions and displays on the exercise repetition counter. The display unit 30 displays the repetition count as well as other information such as the current time.

In one embodiment, the portable exercise repetition counter is a pedometer that is worn by an exerciser to count the number of steps he or she walks or runs. In another embodiment, it is an apparatus that a swimmer can attach to the body to count the number of strokes during swimming. In yet another embodiment, it is an event counter that counts the number of exercise event an exerciser accomplishes.

Figure 2:
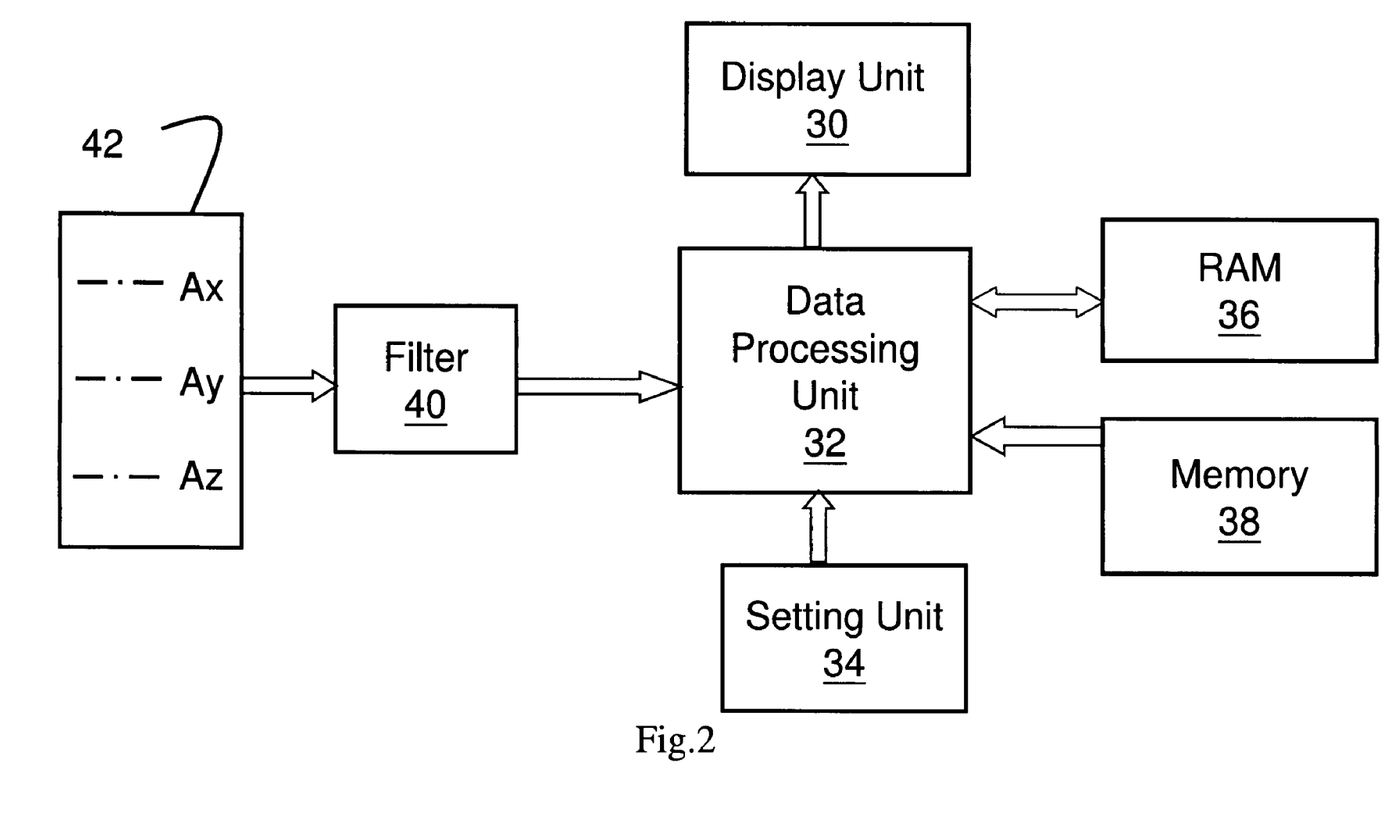
FIG. 2 is a system block diagram of one embodiment of the exercise repetition counter.

An exemplary embodiment of the exercise repetition counter in the form of a pedometer is used herewith to disclose the invention ideas in the following paragraphs. Referring now to FIG. 2, the internal hardware system components of the pedometer include a 3-axes accelerometers 42, which detect the acceleration signals along the three axes when the exerciser is walking or running. Then the acceleration signal will be smoothed by the filter 40. The data processing unit 32 processes the three axes filtered acceleration information and calculates the number of the steps the exerciser has taken. The data processing unit outputs the calculated results to the user in the display unit 30 for displaying. The display unit 30 is preferably a Liquid Crystal Display (LCD). The data processing unit 32 is coupled with a setting unit 34 for setting the various parameters such as weight and time. Also, it is coupled with a Random Access Memory (RAM) 36 for a temporary storage of step signals. Moreover, it is connected to a memory 38, which stores the exercise information of the user (exercise time, calorie, etc).

Figure 3:
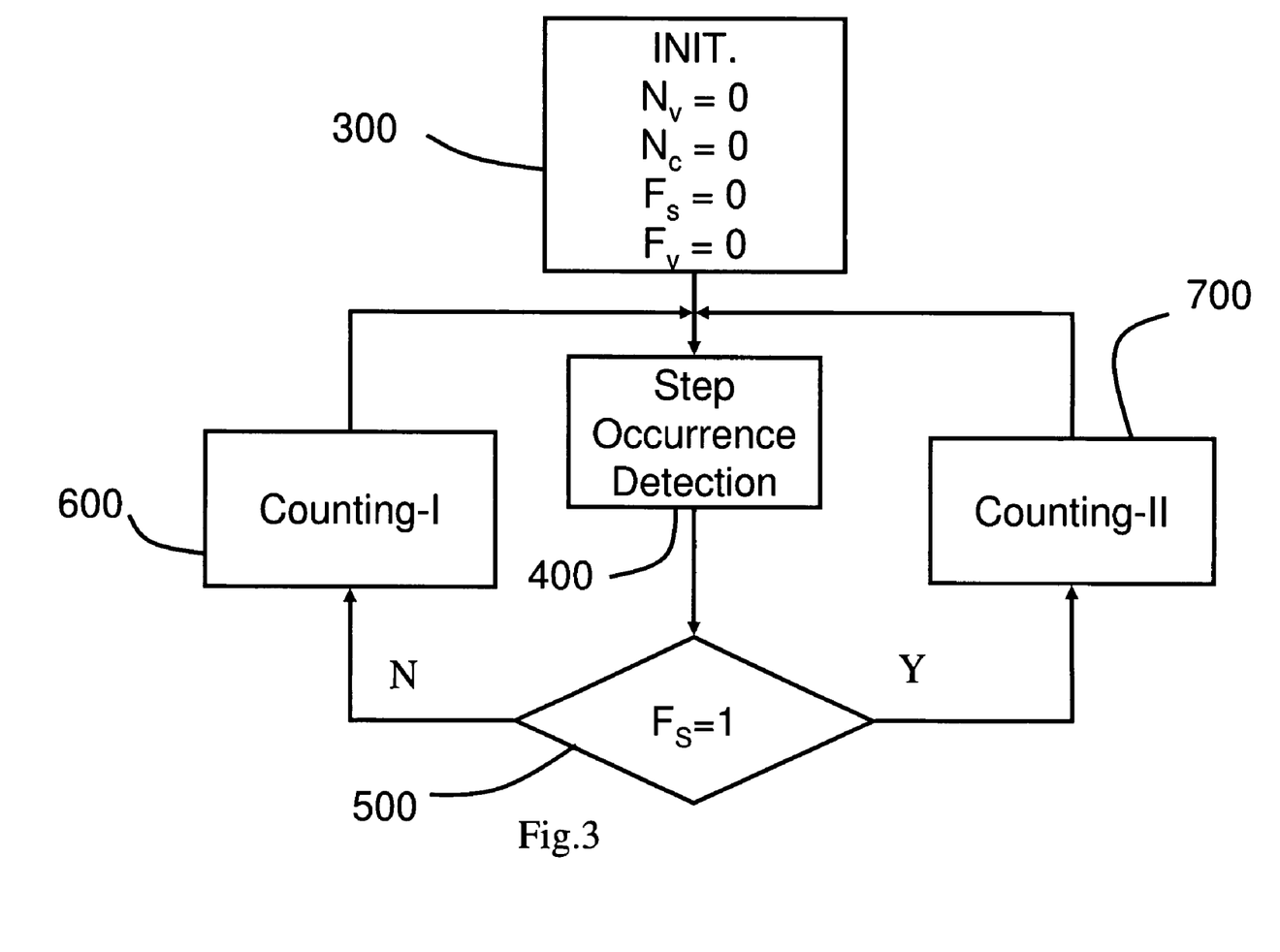
FIG. 3 is a simplified flow chart showing the working principle of the exercise repetition counter in one embodiment.

Now turning to the operation of the device described above, FIG. 3 shows the overall operation flow of the pedometer in one exemplary embodiment. When the device is initially powered on, the data processing unit 32 starts to execute a software program. It first performs step 300 to reset some of the parameters like the total repetition count $N_v$, the valid axis flag $F_v$, the step flag $F_s$ and the initial step number $N_c$. Afterwards, it enters into a loop that processes in the acceleration signals from the acceleration sensors. Firstly, it invokes the step occurrence detecting procedure 400 to detect exercise steps based on the sampling of the signal $A_x$, $A_y$, $A_z$ and the predetermined cycle threshold and amplitude threshold. In one embodiment, the sample rate is 16 Hz. In this procedure, an exercise step is recognized when the acceleration signal $A_c$ ($A_c$ denotes the current axis. If the current axis is on X-axis, $A_c$ is $A_x$; if the current axis in on Y-Axis, $A_c$ is $A_y$; if the current axis is on Z-axis, $A_c$ is $A_z$.) shows a positive peak higher than the amplitude threshold $A_{cthr}$, and longer than the cycle $T_{cthr}$. The threshold $A_{cthr}$ and $T_{cthr}$ are functions of signal envelope such as amplitude and cycle. Afterwards, control is passed to step 500 to check whether a sequence of steps has been recognized. If the number of steps detected along the current-axis has not reached 16 steps, the step flag $F_s$ is set to zero ($F_s$=0), otherwise the step flag $F_s$ is set to one ($F_s$=1). If the step flag $F_s$ is zero ($F_s$=0), control is passed to execute the Counting-I procedure 600, otherwise it is passed to execute the Counting-II procedure 700. Then the algorithm proceeds to execute the step occurrence detecting procedure 400 again.

Figure 4:
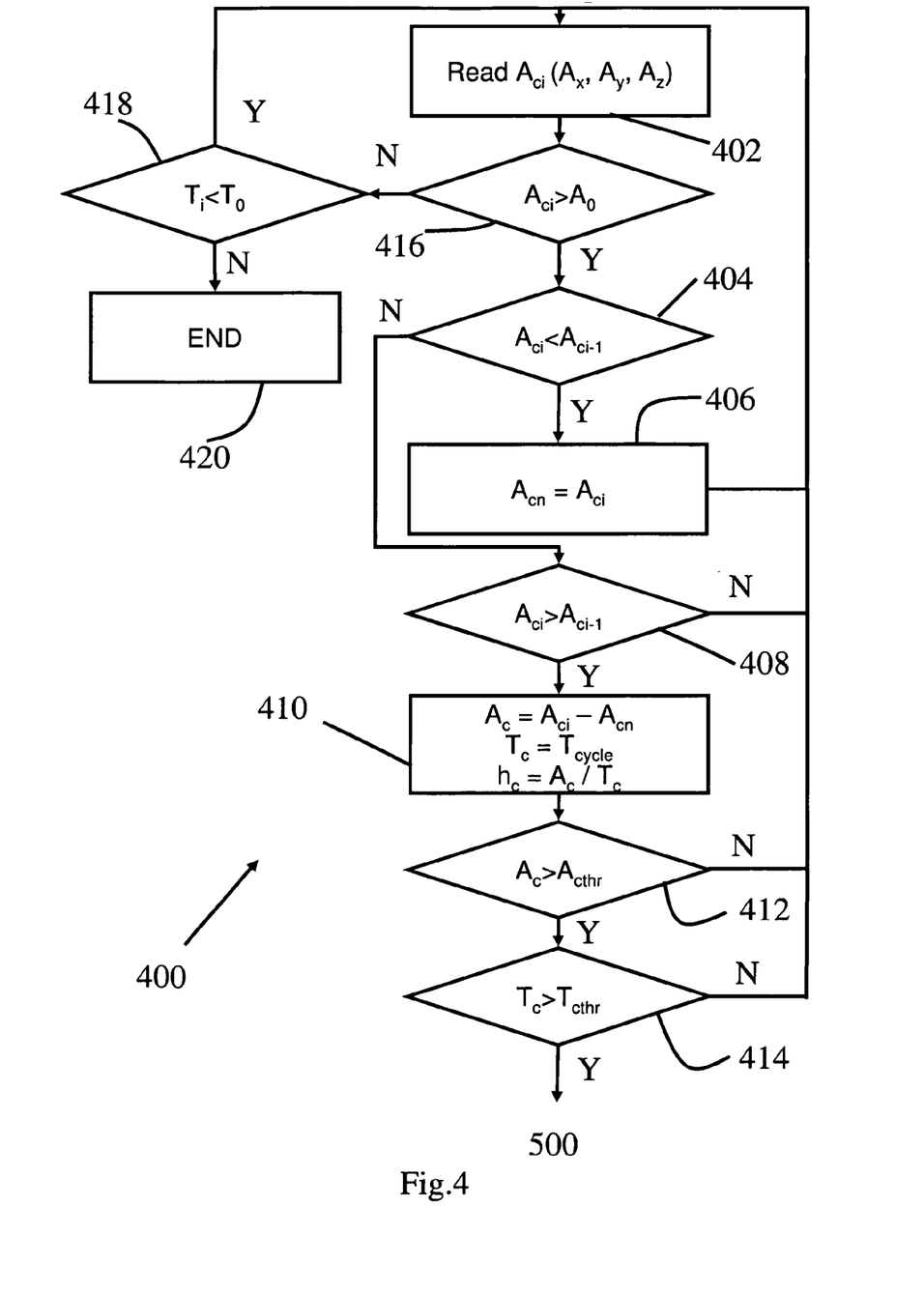
FIG. 4 is a flow chart showing the step occurrence detection procedure in one embodiment.

FIG. 4 disclosed in details one exemplary embodiment of the step occurrence detecting procedure 400. Firstly, in step 402 the filtered acceleration data from the three axes are read. In one embodiment, the three axes are orthogonal with respect to each other. The acceleration data is referred as acceleration profiles which include repetitive waveforms with amplitude movements and acceleration cycles. The character 'c' represents an axis and it could be 'X', 'Y' or 'Z'. The operation steps 402 to 420 are to be repeated three times, each time along one axis with 'c' taking on value 'X', 'Y', 'Z' respectively. (As an example, $A_c$ becomes $A_x$ the first time; $A_y$ the second time and $A_z$ the third time.

In step 416, the algorithm determines if the current amplitude $A_{ci}$ is smaller than a fixed amplitude value $A_0$. If $A_{ci}$ is smaller than $A_0$, then the algorithm further determines if the current cycle $T_i$ is small than a fixed cycle value $T_0$ in step 418. If so, this normally indicates that there is no motion activity by the exerciser and control is passed to step 420 which is the end of this procedure. In one embodiment, the device enters a sleeping mode in order to save battery energy under this situation. In this mode, the sampling rate of the device is reduced to 1 Hz. The device continuously monitors the difference between $A_{ci}$ and $A_{ci-1}$. It will 'wake up' and return to normal working status when $A_{ci}-A_{ci-1}>A_1$ where $A_1$ is a preset threshold, which is in the range of 0.07 to 0.13.

If $A_{ci}$ is larger than $A_0$, then the current $A_{ci}$ is compared with its previous value $A_{ci-1}$ as shown in steps 404 and 408. If $A_{ci}$ is smaller than $A_{ci-1}$, then $A_{ci}$ is descending and $A_{cn}$, the negative peak of the amplitude movement, takes on the value of $A_{ci-1}$ and control flow goes back to step 402 to read next $A_{ci}$. When the next $A_{ci}$ is larger than $A_{ci-1}$, a negative peak value $A_{cn}$ is found and then and the algorithm jumps to step 408. Step 408 checks if $A_{ci}$ is higher than $A_{ci-1}$. If so, then $A_{ci}$ is ascending. To ensure that $A_{ci}$ is not equal to the negative peak value $A_{cn}$, step 408 proceeds to step 410 only when $A_{ci}$ is higher than $Ac_{i-1}$ but not equal to it. In block step, the amplitude difference between $A_{ci}$ and $A_{cn}$, which is $A_c$, the current cycle $T_c$, and a ratio $h_c$ are computed. The cycle $T_{cycle}$ in step 410 is the time interval of two positive peaks and the positive acceleration peak $A_c$ is also referred as a step peak. Then, in steps 412 and 414, $A_c$ and $T_c$ are compared with the current amplitude threshold $A_{cthr}$ and current cycle threshold $T_{cthr}$ respectively. If both values are larger than their thresholds, then the algorithm will invoke either the Counting-I procedure 600 or the Counting-II procedure 700, depending on whether $F_s$ is zero or one. Otherwise the algorithm goes back to step 402 to detect another exercise step occurrence. As the three accelerometers are measuring data simultaneously, steps 402 to 420 are executed for each of the 'X', 'Y' and 'Z' axes. The algorithm checks the acceleration profile in each of the axes whether it satisfies the thresholds criteria. As long as one of the acceleration profiles falls within the thresholds, that axis becomes the current axis; i.e. the character 'c' is assign to the label of that axis.

Figure 5:
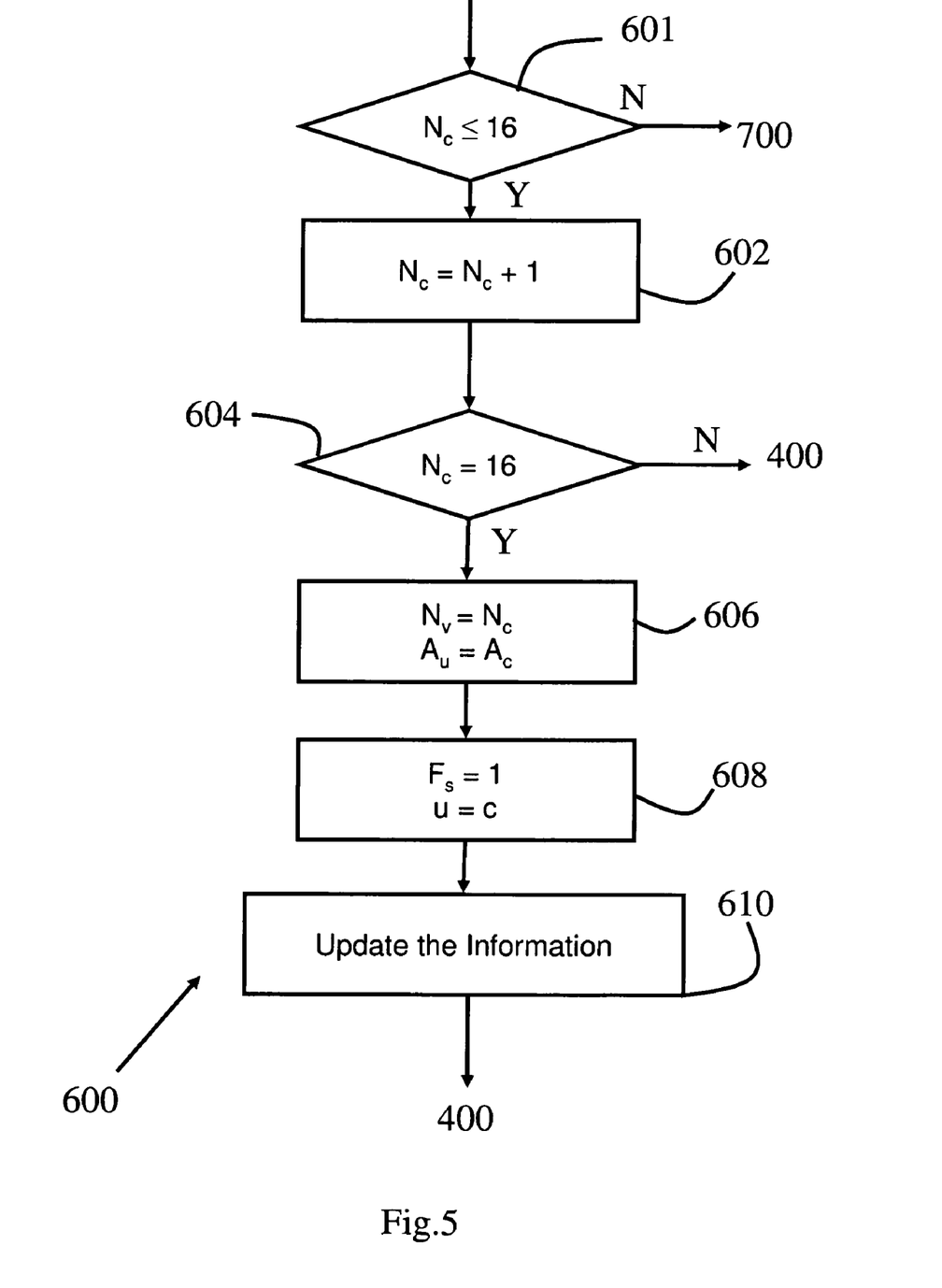
FIG. 5 is a flow chart showing the Counting-I procedure in one embodiment.

FIG. 5 further explains the detailed operational flow of the Counting-I procedure 600 in one embodiment. In step 601, if the current step number $N_c$ is greater than 16 ($N_c$>16), the procedure will go to step 700, that is the Counting-II procedure. Otherwise $N_c$ is incremented by 1 in step 602. Then the procedure checks whether $N_c$ is equal to 16 in step 604. If so, control flow goes to step 606. Otherwise, it returns to the step occurrence detection procedure 400. Steps 606 and 608 then update the repetition count $N_v$ to be 16, set the valid axis 'u' to the current axis 'c' assign $A_c$ to $A_u$, and set the flag $F_s$ to one. Next, the amplitude threshold and the cycle threshold are updated, and the detailed step information such as the cycle and amplitude information of the previous five steps, and the valid cycle and amplitude information of the previous five steps are recorded in step 610. In one embodiment, the amplitude threshold $A_{cthr}$ and cycle threshold $T_{cthr}$ are computed from the peak values of amplitudes and cycles from a plurality of previous steps. In an alternative embodiment, the $A_{cthr}$ equals to a first coefficient $K_1$ multiplied by the mean value of amplitudes of previous 5 steps and $T_{cthr}$ equals to another coefficient $K_2$ multiplied by the mean value of cycles of previous 5 steps. In essence, the Counting-I procedure 600 is to ensure that the activity of the user is a repetitive activity.

In the Counting-I procedure 600, it is required that the exercise is relatively consistent and consecutive. Then the amplitude threshold $A_{cthr}$ and cycle threshold $T_{cthr}$ are computed based on the last few exercising steps. In an embodiment as mentioned above, sixteen valid steps are required and the last five steps are used in calculating the thresholds.

The exercise counts of the initial 16 steps will not be displayed on the display means to the exerciser but the steps are still saved in the memory means of the device. When the device counts the $17^{th}$ step and afterward, the correct reading will be displayed, including the initial 16 steps. The number 16 is chosen in this embodiment to balance the effective capturing of the repetitive patterns and the reasonable response time to the user. If there are less than 16 consecutive valid steps, it means that the movements of the user is not repetitive enough and the algorithm continues to look for a next consecutive sequence of 16 valid steps before it formally starts to count the repetition count.

Figure 6A:
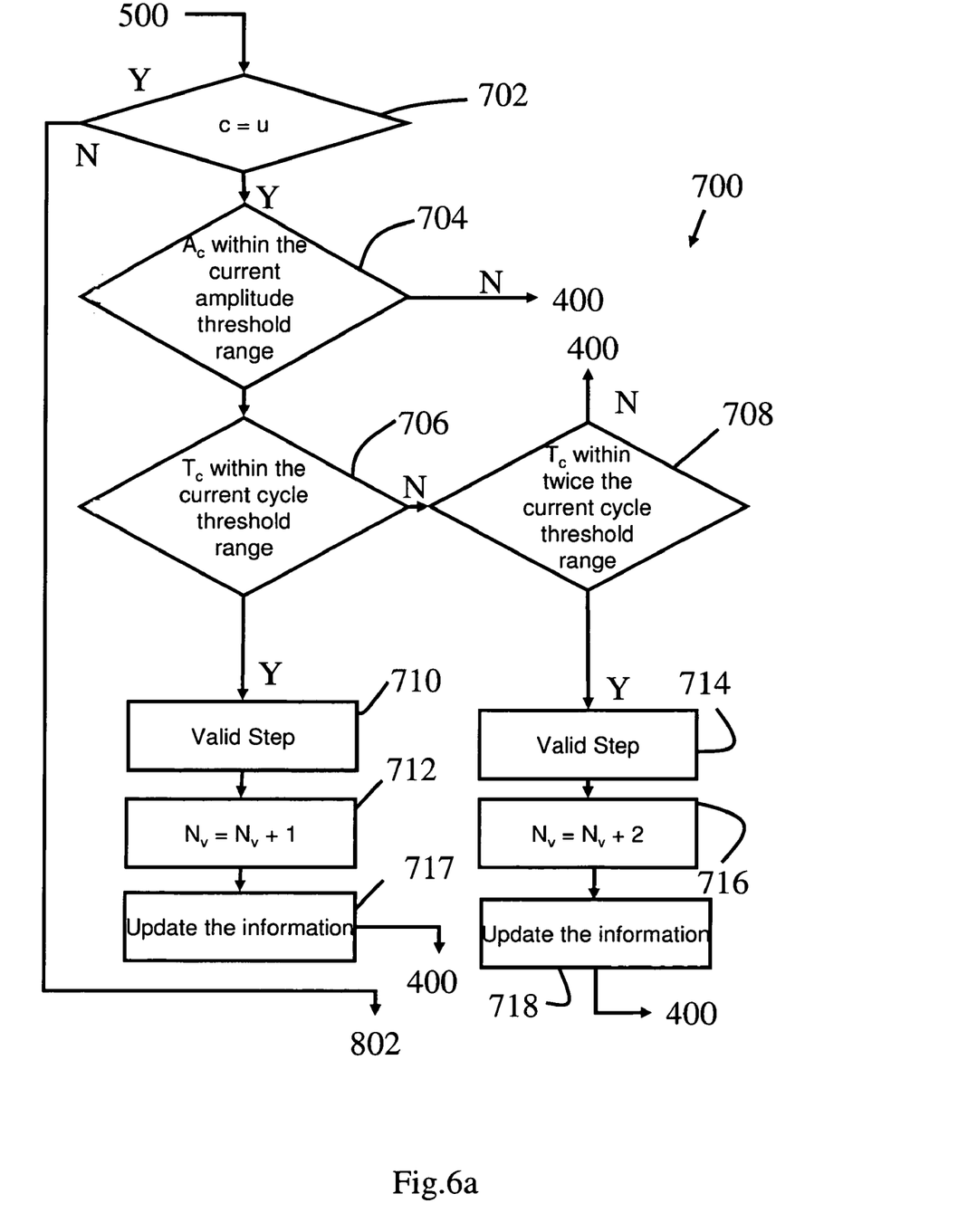
FIGS. 6a and 6b are flow charts showing the Counting-II procedure in one embodiment.
Figure 6B:
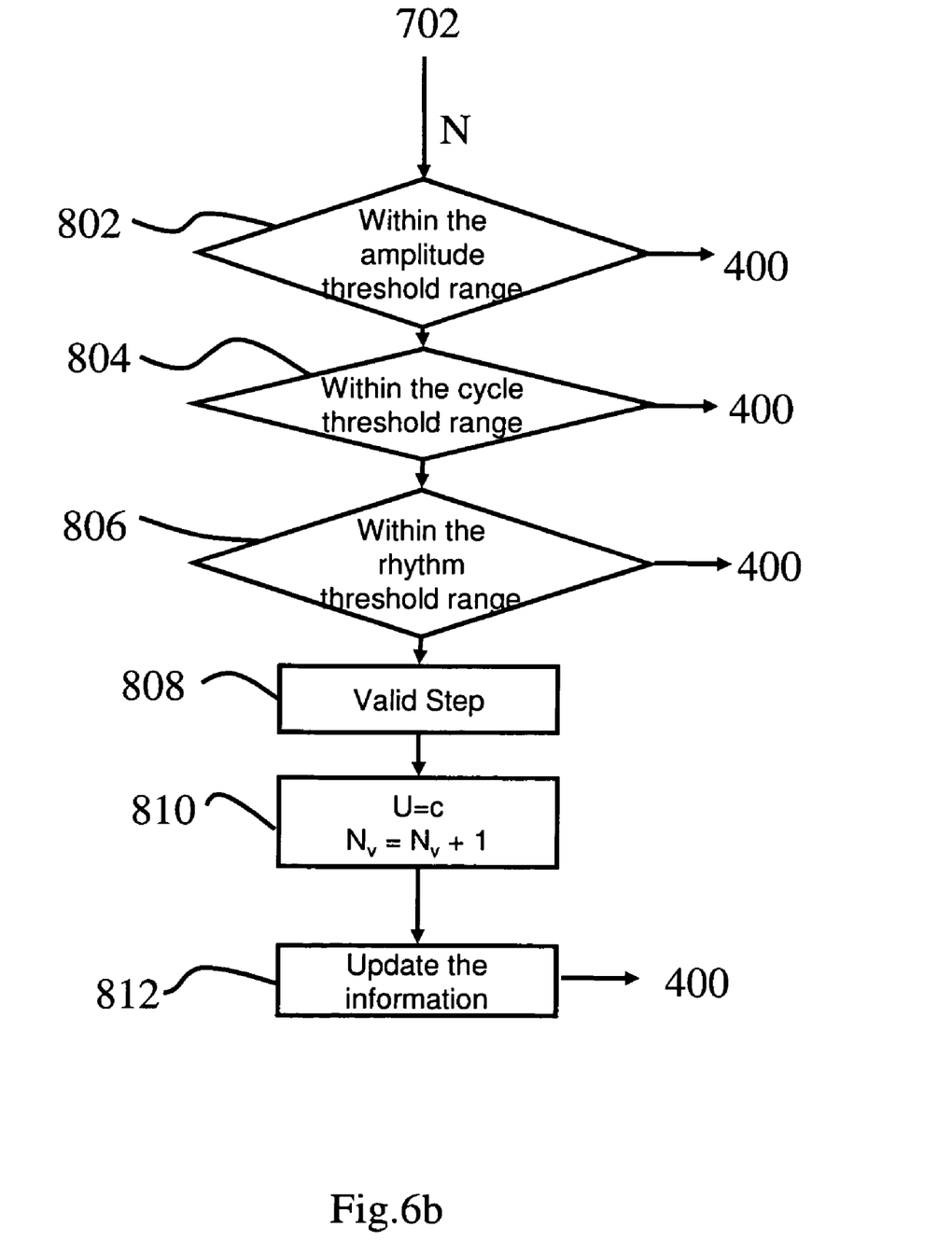

The operation flow of Counting-II procedure 700 in one embodiment is shown in FIG. 6. In explaining this flow chart, we adopt the similar notation as mentioned above that the character 'c' and 'u' are 'variables' that can take on value of 'X', 'Y', or 'Z', representing the three axes in 3D space. Firstly, step 702 checks whether the current axis 'c' is to the same as the valid axis 'u'. If so, the algorithm enters into the step-regulation checking unit which comprises steps 704 and 706. In detail, step 704 checks if the current amplitude $A_c$: (e.g. $A_x$, $A_y$ and $A_z$) is within the amplitude range between $A_{uthr}$–a1 and $A_{uthr}$+a1. Similarly, step 706 checks if the cycle range is between $T_{uthr}$–b1 and $T_{uthr}$+b1. (where a1, b1 are constants). If the step-regulation checking unit judges the conditions are satisfied, a valid step is declared in step 710 and the repetition count $N_v$ is incremented by one in step 712. In the situation that $A_c$ falls within the amplitude threshold and $T_c$ is longer than one cycle threshold but shorter than twice of the cycle threshold, two valid steps are declared in step 714 and the repetition count $N_v$ will be incremented by two in step 716. This is because sometimes the algorithm is not able to detect a step peak although the user is making a normal movement and this makes the repetition count incorrect. For example, sometimes the step peaks of two consecutive exercise steps are different, such that the first step has a strong step peak but the next step has a weak step peak. When this happens, it is possible that the weak step peak is not detected. So incrementing $N_v$ by two compensates for the repetition count in this case. Meanwhile, the information of the previous five valid cycles and amplitudes is updated and the information on the current axis is also updated in step 717 and step 718. If neither of the steps 704, 706 or 708 is satisfied, then control is passed back to step occurrence detection 400 to detect another valid step.

If in step 702, it is found that the current axis 'c' is not the valid axis 'u', step 802 will be executed. The operation flow starting from step 802 onward to step 812 are designed to enhance the accuracy and reliability of counting a valid step, even when the user is changing his movement style or placing the device in a different orientation. The software implements an algorithm to select an optimal axis in detecting exercising steps. In summary, when the current axis 'c' is different from the valid axis 'u' ('u' is also referred as the previous optimal axis), the software computes various indicators based on the measurements from the previous five steps on the current axis, and check whether they falls within an amplitude threshold range, a cycle threshold range and a rhythm threshold range. When all these conditions are satisfied, then the current axis becomes the valid axis.

A detailed description of how this is done is given here. Firstly, a similar step-regulation checking unit mentioned previously is used to judge whether the current amplitude and cycle falls within the threshold ranges. However, the threshold judgment is different from the previous case. Instead of using amplitude alone, the ratio of amplitude divided by cycle time (i.e. $H_c=A_c/T_c$) is used. This ratio represents the exercise intensity. The exercise intensity is higher when the ratio is larger. Hence in step 802, the amplitude values of the previous 5 steps on the current axis are divided by the corresponding cycle times respectively. If the mean of the previous 5 ratios exceeds a threshold $h_0$ ($h_0$ is the mean of the amplitude ratios of the previous 5 valid steps minus a constant h which is set to 0.2), the step regulation checking unit continues. It then compares the cycle threshold in step 804. If the mean of the current previous 5 cycles is within the range of the mean of the previous 5 valid cycles, then the rhythm is compared in step 806. If the rhythm is better, the current step is a valid step. The valid axis becomes the current axis and the step number is incremented. The information such as the valid steps information and the information on the valid axis are updated in step 808, 810 and 812. Otherwise, it returns to step 400.

The rhythm is judged using the following steps:
1) Calculate the mean of the previous 5 cycles on the current axis;
2) Calculate the absolute differences between the previous 5 cycle values and the mean of the previous 5 cycles;
3) Calculate the absolute of the difference.
4) Calculate the sum of the previous 5 cycle absolute differences;
5) Repeat steps 1)-3) for the previous 5 cycles on the valid axis;
6) If the sum of the previous 5 cycle absolute differences on the current axis is less than the sum of the previous 5 cycle absolute differences on the valid axis, then the current step is the valid step and the valid axis is the current axis.
7) Otherwise, it goes back to step occurrence detecting procedure 400.

Figure 7:
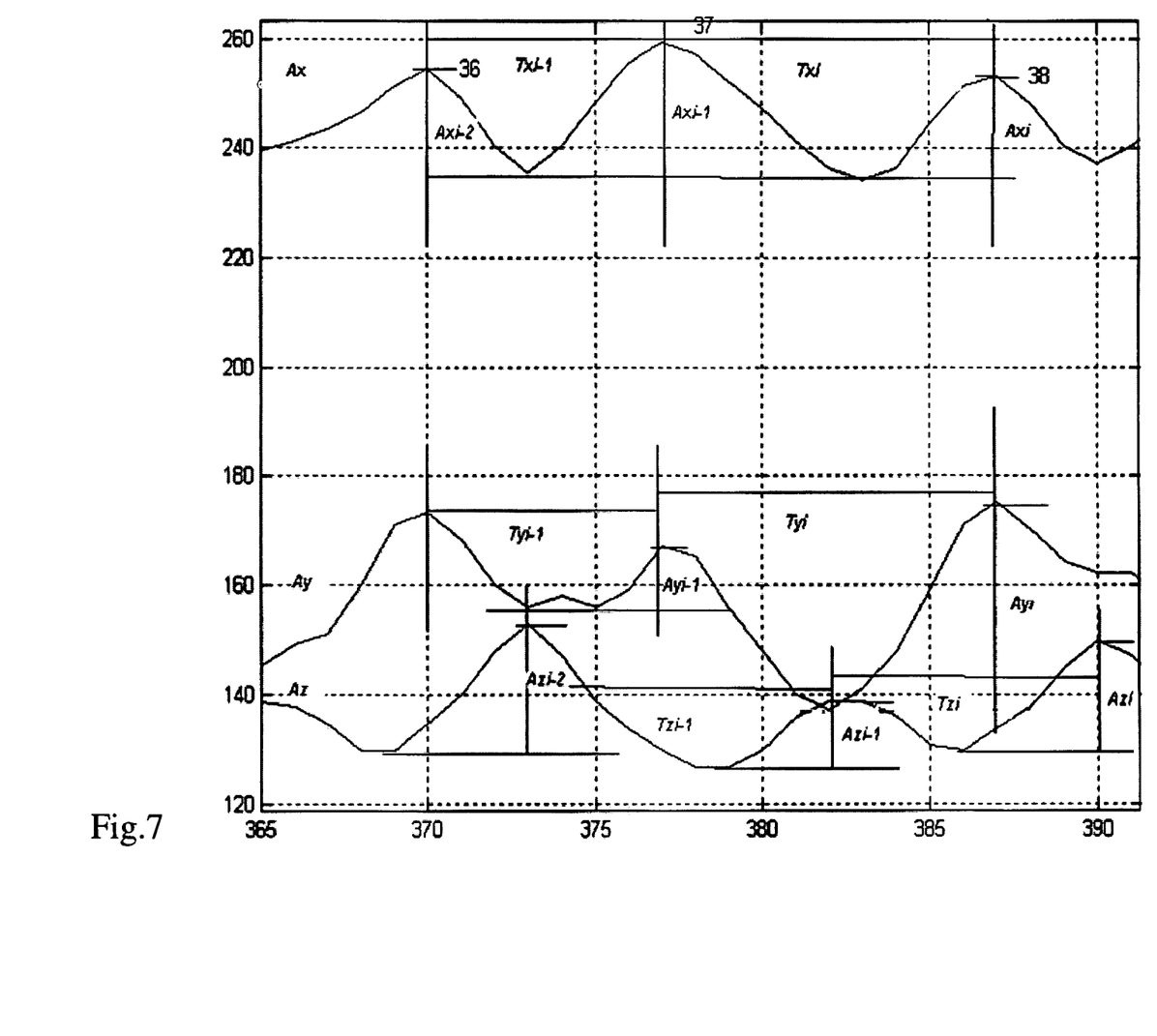
FIG. 7 shows a sample waveform diagram of the acceleration data measured by an accelerometer.

FIG. 7 gives a graph illustrating the amplitude and cycle in an example. The cycle $T_c$ is the time interval between two positive peak points. The amplitude $A_c$ is the difference between the positive peak value and the negative peak value.

Figure 8:
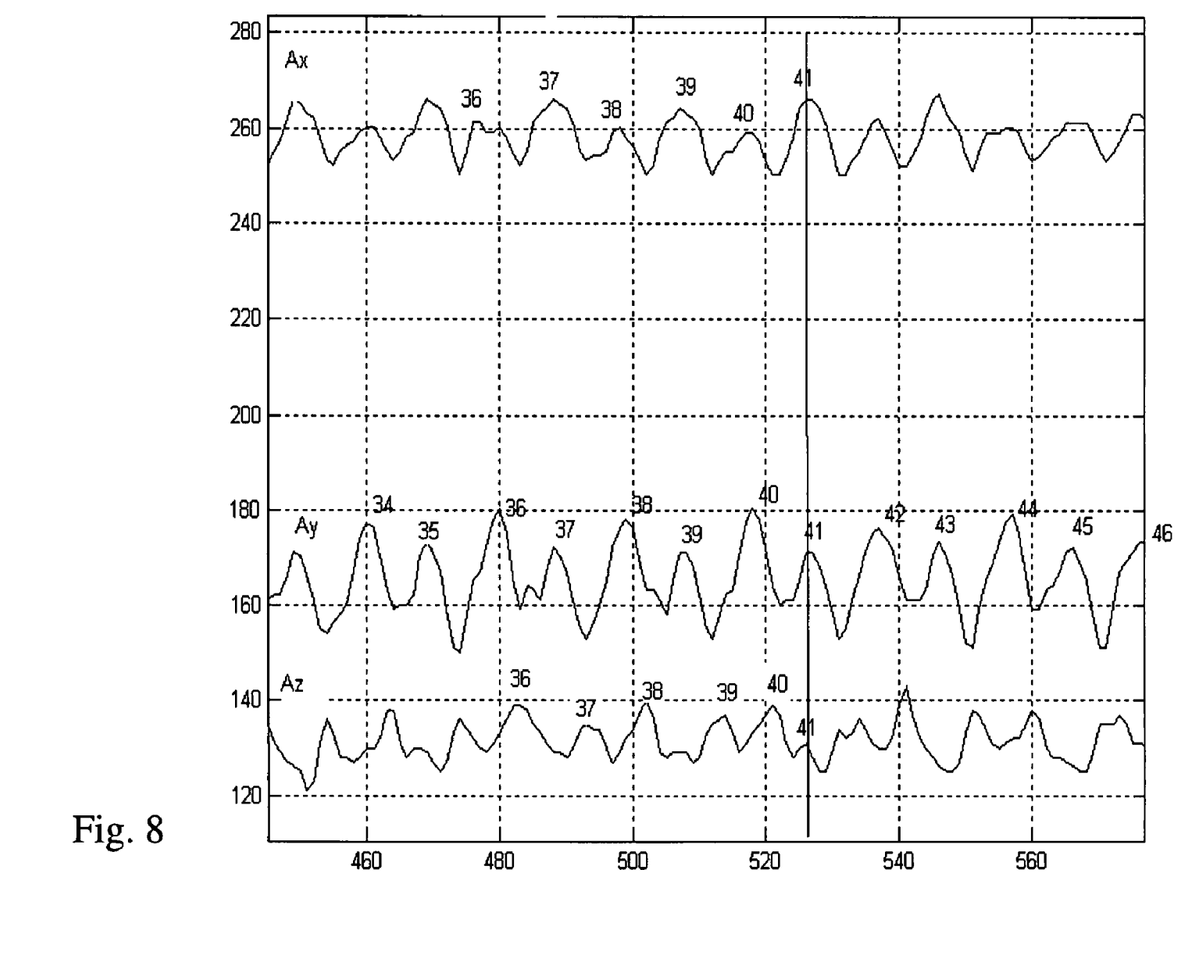
FIG. 8 shows an example of the step number increment on one axis.

FIG. 8 gives a detailed illustration for step number increment when changing the axis. When the $41^{st}$ exercise step is calculated, it is the Z-axis that first detects an exercise step according to the step occurrence detecting procedure 400. However, the valid axis is Y-axis. The previous 5 valid amplitudes on the Y-axis are found to be 11, 9, 11, 8 and 11. The corresponding valid cycles are 12, 14, 15, 13 and 13. The previous five valid amplitude ratios are therefore 0.92, 0.64, 0.73, 0.62, and 0.85. The mean of the valid amplitude ratios is 0.75. The mean of the valid cycles is 13.4. The previous 5 amplitudes on Z-axis are found to be 9, 19, 12, 17 and 10 and the corresponding cycles on Z-axis are 10, 13, 10, 9, and 13. The previous 5 amplitude ratios on Z-axis are 0.9, 1.46, 1.20, 1.89 and 0.77. The mean of the amplitude ratios on Z-axis is 1.24. Since this is greater than the mean of the valid amplitude ratio 0.75 minus a constant $h_0$ which is set to 0.2, the current step amplitude passes the amplitude threshold test of step 802. The algorithm proceeds to step 804. Here the criteria is that the mean cycle of the current axis must not deviate to that of the valid axis by three (i.e. b1 is set to 3). From the data, the mean of current cycle (the Z axis) is 11 while the mean of the valid axis (the Y axis) is 13.4. Since 11 is less than (13.4+3) but greater than (13.4−3), it also passes the cycle threshold test of step 804. Next, the algorithm checks the rhythm in step 806. The absolute values of the valid cycle differences are 1.4, 0.6, 1.6, 0.4, and 0.4. The sum of the absolute valid cycle differences is 4.4. The absolute values of the cycle difference on Z-axis are 1, 2, 1, 2, and 2. The sum of the differences is 8.0. Since 8.0 is greater than 4.4, it fails the test and therefore, the current step is not a valid step. Next, the step occurrence detecting procedure 400 detects an exercise step in the Y-axis. The Counting-II procedure 700 is entered again. Since both the current axis and the valid axis are the Y-axis, it satisfies the condition test of step 702. The current amplitude and cycle are found to be 9 and 13 respectively. The new previous valid amplitudes and cycles are 9, 11, 8, 11 and 9 and the cycles are 14, 15, 13, 13 and 13. It satisfies both the amplitude threshold test 704 and cycle threshold test 706. So the current step as detected in the Y-axis is the valid $41^{st}$ step and also the Y-axis remains to be the valid axis.

Figure 9:
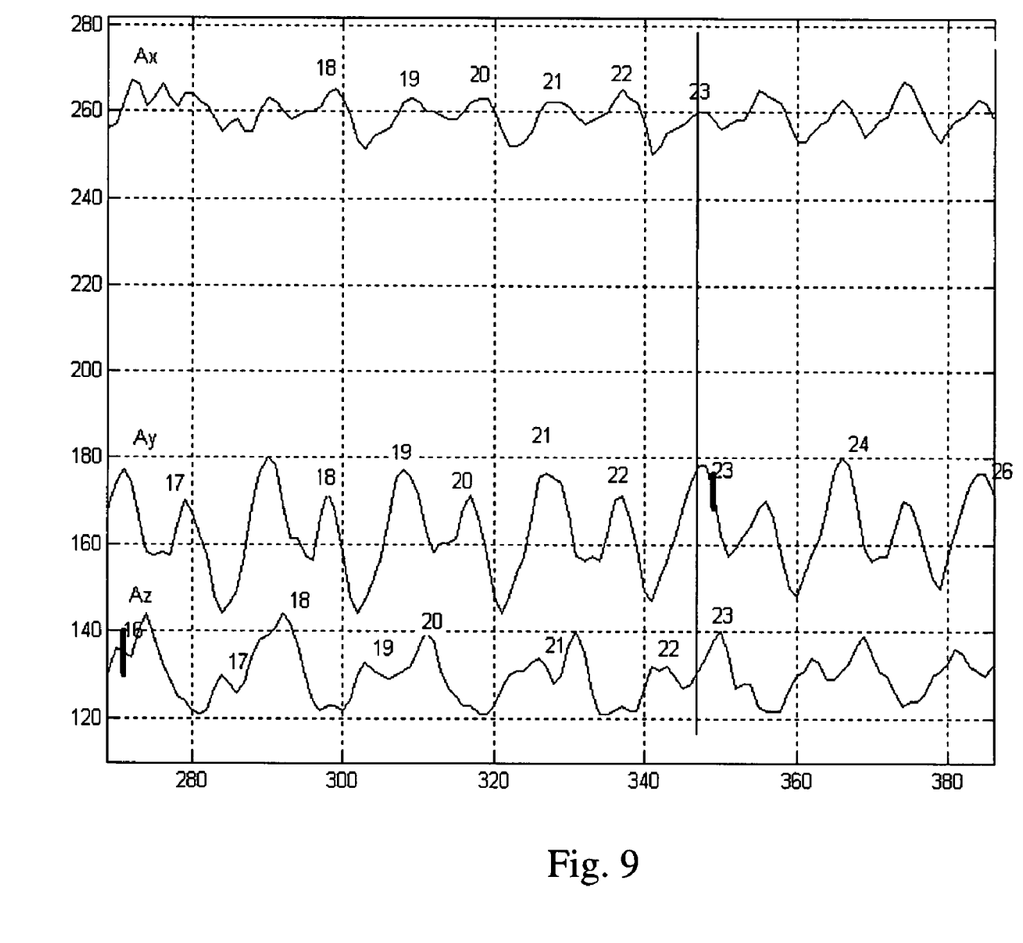
FIG. 9 shows another example of the step number increment on one axis.

FIG. 9 gives another detailed illustration on how the optimal axis is selected. First of all, at the onset of the 23rd step, the step occurrence detecting procedure 400 detects an exercise step on Y-axis. But the current valid axis is the Z-axis. The previous 5 amplitudes on Y-axis are 8, 10, 9, 10 and 10; and the cycles are 16, 16, 14, 16, and 16. The previous 5 amplitude ratios on Y-axis are 0.50, 0.63, 0.64, 0.63, and 0.63. Their mean is 0.60. At this time, the previous 5 valid amplitudes are 8, 14, 8, 11 and 8 and the cycles are 15, 15, 14, 17, and 17. The previous valid amplitude ratios are 0.53, 0.93, 0.57, 0.65, and 0.73. The mean is 0.68. Since the mean amplitude ration on the Y-axis 0.60 is greater than the mean of the valid amplitude ration 0.68 minus a constant $h_o$ which is set to 0.2, it satisfies the amplitude threshold test as represented by step 802.

Next, the mean of the previous 5 cycles on Y-axis is 15.6, whereas the mean of the previous 5 valid cycles on the Z-axis is also 15.6. Thus, the cycle test (step 804) also satisfies. Next, the absolute values of the cycle differences on Y-axis are computed and they are 0.4, 0.4, 1.6, 0.4 and 0.4. The absolute values of the valid cycle differences on the Z-axis are 0.6, 0.6, 1.6, 1.4 and 1.4. The sum of the absolute difference is 3.2 for Y-axis and 5.6 for the valid axis. Hence, the rhythm on Y-axis is better than that on the Z-axis. Therefore, the current step is one valid step and the valid axis is switch to Y-axis. Thus the Y-axis replaces the Z-axis as the optimal axis.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the number of consecutive steps used in the Counting-I procedure 600 is set to sixteen as described in the aforementioned embodiment. But one skilled in the art should understand that other value can also be applied as long as it is long enough to ensure a repetitive movement of the user.

While a method of identifying optimal axis is disclosed in previous embodiments. Other methods may be used. As an example, when the current axis is changed, the software may look for the past three consecutive steps. In this method, the thresholds comparators are the same of the previous optimal axis. Only when the last two steps are on the same axis and they are different from the first step, the current axis will be considered to be an optimal axis. If the second step and the third step is not the same, i.e., the three steps have three different axes, the software will continue to monitor the fourth step and repeat the algorithm. Measuring three steps for valid step count ensures that the user's irregular movement will not interfere with the counting of the repetition counter, e.g. if the valid axes of the last two steps are not the same and at least one of them is different from that of the first step.

While a pedometer is used as an exemplary embodiment to disclose the inventive ideas, the same apparatus can be use to count repetitive events of an exerciser as mentioned previously. For example, the apparatus can be worn by a swimmer to count the number of strokes during swimming. It can further be enhanced to detect a major change of the acceleration profile in swimming which corresponds to the turning around from the end of the swimming pool. Thus the same apparatus can count the number of laps that swimmer has attended as well. Likewise, those skilled in the art can also adapt the invention concepts and apply it to count repetitive events in rob-jumping and weight-lifting. In a further embodiment, the apparatus can also be adopted to count non-exercising repetitive events too.

In the exemplary embodiments described above, the apparatus comprises three accelerometers, which measure the accelerations along three orthogonal axes. But it is also possible to have more than three accelerometers even if they are not measuring the accelerations along orthogonal axes in the space.

Although a portable device is used as an exemplary device in this disclosure, the inventive ideas can be realized in a plurality of ways and need not be confined to a portable form factors. In other embodiments, the inventive ideas can be implemented as an electronic module of an exercising machine. As an example, it can be incorporated in a track mill or weight-lifting machine to count the repetitions that an exercise makes.

What is claimed is:

1. An apparatus for counting exercise repetitions comprising
   a) three accelerometers simultaneously measuring acceleration data of an exerciser along three different directions to obtain acceleration profiles; each said acceleration profile further comprising an amplitude movement and an acceleration cycle along said direction; and
   b) a data processing unit executing a counting procedure to increment a repetition count if said amplitude movement in at least one said acceleration profile falls within a first amplitude threshold and said acceleration cycle in the same said acceleration profile falls within a first cycle threshold;
   wherein said apparatus counts said exercise repetitions of said exerciser irrespective of an orientation of said apparatus.

2. The apparatus of claim 1, wherein each of said three accelerometers measure acceleration along one of three orthogonal axes in three dimensional spaces.

3. The apparatus of claim 2 wherein each said acceleration profile further comprises a rhythm that is judged from the repetitive steps of said exerciser; and an optimal axis for counting exercise repetition is identified, said optimal axis being the axis where said amplitude movement, acceleration cycle and rhythm in said acceleration profile of said axis satisfy a second amplitude threshold, a second cycle threshold and a first rhythm threshold respectively.

4. The apparatus of claim 1, wherein said first amplitude threshold and said first cycle threshold are computed from average values of said acceleration data along said direction.

5. The apparatus of claim 1, wherein said repetition count is incremented by two when said amplitude movement falls within said first amplitude threshold and said acceleration cycle is longer than one times said first cycle threshold but shorter than two times said first cycle threshold.

6. The apparatus of claim 1, wherein said apparatus enters sleeping mode if no repetition is counted within a predetermined duration of time.

7. The apparatus of claim 1, wherein said apparatus is a pedometer.

8. The apparatus of claim 1, wherein said apparatus is a swim stroke counter that counts a number of swimming strokes of said exerciser.

9. The apparatus of claim 1, wherein said apparatus is an exercise event counter that counts a number of exercise events that said exerciser completes.

10. A method of counting exercise repetitions comprising the steps of
   a) simultaneously measuring acceleration data of an exerciser along at least three axes by at least three accelerometers to obtain acceleration profiles; each said acceleration profile further comprising an amplitude movement and an acceleration cycle along said axes;
   b) comparing said acceleration profile on each said axis with a first amplitude threshold and a first cycle threshold using a data processing unit; and
   c) adding to a repetition count if said amplitude movement in at least one said acceleration profile falls within a first amplitude threshold and said acceleration cycle in the same said acceleration profile falls within a first cycle threshold.

11. The method of claim 10, wherein said acceleration profiles comprise repetitive waveforms and said first amplitude threshold and said first cycle threshold are computed from said acceleration data along said axis.

12. The method of claim 10, wherein said repetition count is incremented by two when said amplitude movement falls within said first amplitude threshold and said acceleration cycle is longer than one times said first cycle threshold but shorter than two times said first cycle threshold.

13. The method of claim 10, wherein said acceleration profiles further comprises a rhythm that is judged from the repetitive steps of said exerciser; and said comparing step identifies an optimal axis for comparison, said optimal axis being the axis where said amplitude movement, acceleration cycle and rhythm in said acceleration profile of said optimal axis satisfy a second amplitude threshold, a second cycle threshold and a first rhythm threshold respectively.

14. A method of identifying a new optimal axis against a previous optimal axis for counting exercise repetitions comprising
   a) simultaneously measuring the acceleration of an exerciser along at least three axes by at least three accelerometers to obtain acceleration profiles; each said acceleration profile further comprising an amplitude movement and an acceleration cycle along said axes;
   b) detecting a first valid repetition along a first axis by a data processing unit when said amplitude movement of said acceleration profile on said first axis satisfies a first amplitude threshold range and said acceleration cycle of said same acceleration profile satisfies a first cycle threshold range first before the other axes;
   c) if said first axis is different from said previous optimal axis, computing a first amplitude indicator, a first cycle indicator and a first rhythm indicator from said first axis, and a second amplitude threshold, a second cycle threshold range and a rhythm threshold range from said previous optimal axis using said data processing unit;
   d) identifying said first axis as said new optimal axis using said data processing unit when said first amplitude indicator satisfies said second amplitude threshold; said first cycle indicator is within said second cycle threshold range and said first rhythm indicator is within said rhythm threshold range.

15. The method of claim 14, wherein said first amplitude indicator is calculated from the ratios of amplitudes and cycles of a predetermined number of previous repetitions on said first axis; said second amplitude threshold is calculated from the ratios of amplitudes and cycles of a predetermined number of previous repetitions on said second axis; said first cycle indicator is calculated from the cycles of said predetermined number of previous repetitions on said first axis; and said second cycle threshold range is calculated from the cycles of said predetermined number of previous repetitions on said second axis.

16. The method of claim 14, wherein said first rhythm indicator is calculated from the mean of absolute differences between cycles of a first predetermined number of previous repetitions and the mean value thereof on said first axis; and said rhythm threshold range is calculated from the mean of absolute differences between cycles of a second predetermined number of previous repetitions and the mean value thereof on said second axis.

17. The method of claim 14 wherein said new optimal axis replaces said previous optimal axis.

\* \* \* \* \*